(12) United States Patent
Peting et al.

(10) Patent No.: US 8,716,950 B2
(45) Date of Patent: May 6, 2014

(54) METHOD AND CIRCUIT FOR CATCHING EXCESS CURRENT

(75) Inventors: Mark Peting, Yamhill, OR (US); Dale Beyer, Portland, OR (US); Tsutomu Shimomura, Incline Village, NV (US)

(73) Assignee: Neofocal Systems, Inc., Portland, OR (US)

( * ) Notice: Subject to any disclaimer, the term of this patent is extended or adjusted under 35 U.S.C. 154(b) by 160 days.

(21) Appl. No.: 13/466,720

(22) Filed: May 8, 2012

(65) Prior Publication Data

US 2012/0217950 A1    Aug. 30, 2012

Related U.S. Application Data

(63) Continuation-in-part of application No. 12/590,449, filed on Nov. 6, 2009, now Pat. No. 8,344,659.

(51) Int. Cl.
*H05B 37/02* (2006.01)
*G05F 3/02* (2006.01)

(52) U.S. Cl.
USPC ........ 315/291; 315/185 R; 315/212; 315/278; 315/308; 336/198; 336/221; 336/222; 336/225; 323/247; 323/305; 323/311; 323/312

(58) Field of Classification Search
USPC ............ 315/185 R, 186, 212, 278, 279, 291, 315/306, 308, 312; 336/198, 221, 222, 225; 323/247, 305, 311, 312
See application file for complete search history.

(56) References Cited

U.S. PATENT DOCUMENTS

| | | | |
|---|---|---|---|
| 5,952,738 A * | 9/1999 | Miller | 307/116 |
| 6,850,143 B2 * | 2/2005 | Naito et al. | 336/198 |
| 2010/0201285 A1 * | 8/2010 | Dellian et al. | 315/294 |

* cited by examiner

*Primary Examiner* — Douglas W Owens
*Assistant Examiner* — Thai Pham
(74) *Attorney, Agent, or Firm* — Dag Johansen, Esq.

(57) ABSTRACT

Data may be encoded onto a direct current power line by modulating the current on that direct current power line. One method of modulating the current is by placing an inductor on the power line and then using a controlled transistor that turns on and turns off. The inductor will ensure that current keeps flowing but the transistor will induce changes in the current pattern. The excess current from when transistor is turned off must be diverted. Furthermore, to create symmetrical current changes, the inductor should be reverse biased. Thus, a circuit is created that sinks the excess current from when the transistor is turned off and used to reverse bias the inductor.

6 Claims, 10 Drawing Sheets

| Sync byte 291 | Command 292 | Address 293 | Data Payload (36 bytes) 294 | CRC (optional) 295 |

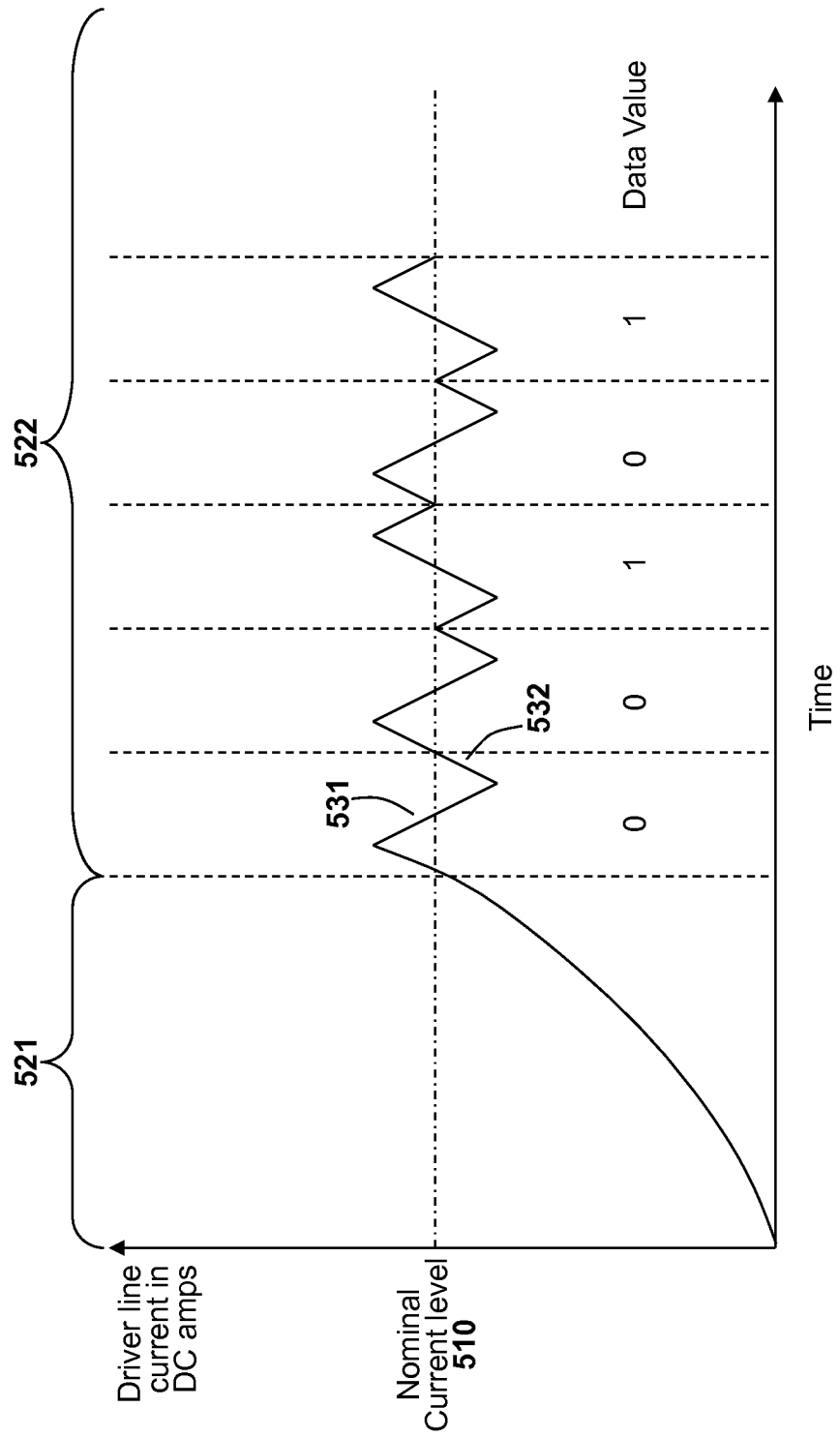

METHOD AND CIRCUIT FOR CATCHING EXCESS CURRENT

RELATED APPLICATIONS

The present application is a continuation-in-part of the U.S. Nonprovisional Patent Application entitled "SYSTEM AND METHOD FOR LIGHTING POWER AND CONTROL SYSTEM" having Ser. No. 12/590,449 that was filed on Nov. 6, 2009.

TECHNICAL FIELD

The present invention relates to the field of electronic power and control systems. In particular, but not by way of limitation, the present invention discloses techniques for implementing a catch circuit for capturing extra current.

BACKGROUND

Light Emitting Diodes (LEDs) are a very energy efficient electronic lighting source. The first generation of LEDs emitted red light with a very small amount of illuminating power. However, modern LEDs can now generate light across the visible, ultraviolet, and infra-red wavelengths. Furthermore, modern LEDs can be provided with a significant amount of current such that LEDs can produce enough light to be used as illumination sources.

Driving LEDs is much more complex than driving a traditional incandescent light bulb. A traditional incandescent light bulb can be driven merely by putting the bulb directly into a traditional household AC circuit. LEDs require carefully controlled DC power. Furthermore, many individual LEDs must be powered to provide the same light output as a single incandescent light bulb. Thus, designing efficient LED power circuits is important for the success of LED lighting. It would therefore be desirable to create efficient power supply and driving circuitry for LED based lighting systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 5C illustrates a current diagram of current modulated by the circuit of FIGS. 5A and 5B.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a system that efficiently transmits output information to control Light Emitting Diodes (LEDs), the teachings of this disclosure can be used to transmit output information to control other light emitting components or even communicate bi-directionally with sensor devices that return data. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
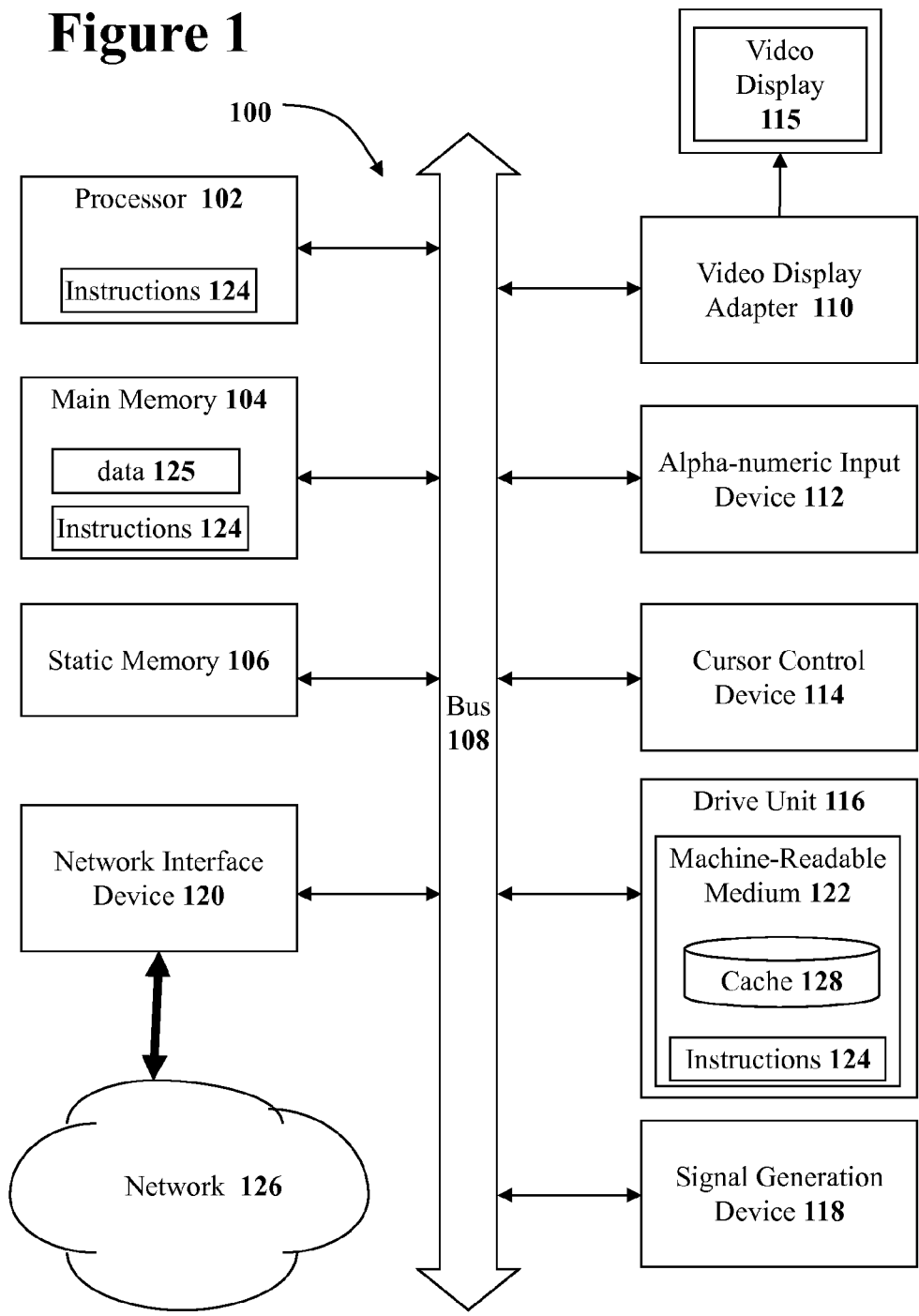
FIG. 1 illustrates a diagrammatic representation of a machine in the example form of a computer system within which a set of instructions, for causing the machine to perform any one or more of the methodologies discussed herein, may be executed.

The present disclosure concerns computer systems since computer systems are generally used to control LED lighting and display systems. FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, an output signal generation device 118, and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media. Note that the example computer system 100 illustrates only one possible example and that other computers may not have all of the components illustrated in FIG. 1

The instructions 124 may further be transmitted or received over a computer network 126 via the network interface device 120. Such transmissions may occur utilizing any one of a number of well-known transfer protocols such as the File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

In the present disclosure, a computer system may comprise a very small microcontroller system. A microcontroller may comprise a single integrated circuit that contains the four main components that create a computer system: an arithmetic and logic unit (ALU), a control unit, a memory system, and an input and output system (collectively termed I/O). Microcontrollers are very small and inexpensive integrated circuits that are very often used in digital electronic devices.

Multiple-LED Control System Overview

To control multiple Light Emitting Diodes (LEDs), or any other controllable light source, the present disclosure introduces a single-wire multiple-LED power and control system. Specifically, individually controlled LED units are arranged in a series configuration that is driven by a head-end control unit located at the head of the series. The series of separate individually controlled LED units may be referred to as a "line" or "string" of lighting devices and the head-end control unit for the series may be referred to as the "line driver" or "string driver" since the head-end control unit provides the electrical power and control signals to drive all of the individually controlled LED units on the line or string. Although the present disclosure is focused on controlling LEDs or other light sources, the teachings of the present disclosure may be used to provide power and control to any other type of electronic device such as sound systems, motors, sensors, cameras, Liquid Crystal Displays (LCDs), etc.

Figures 2A, 2B:
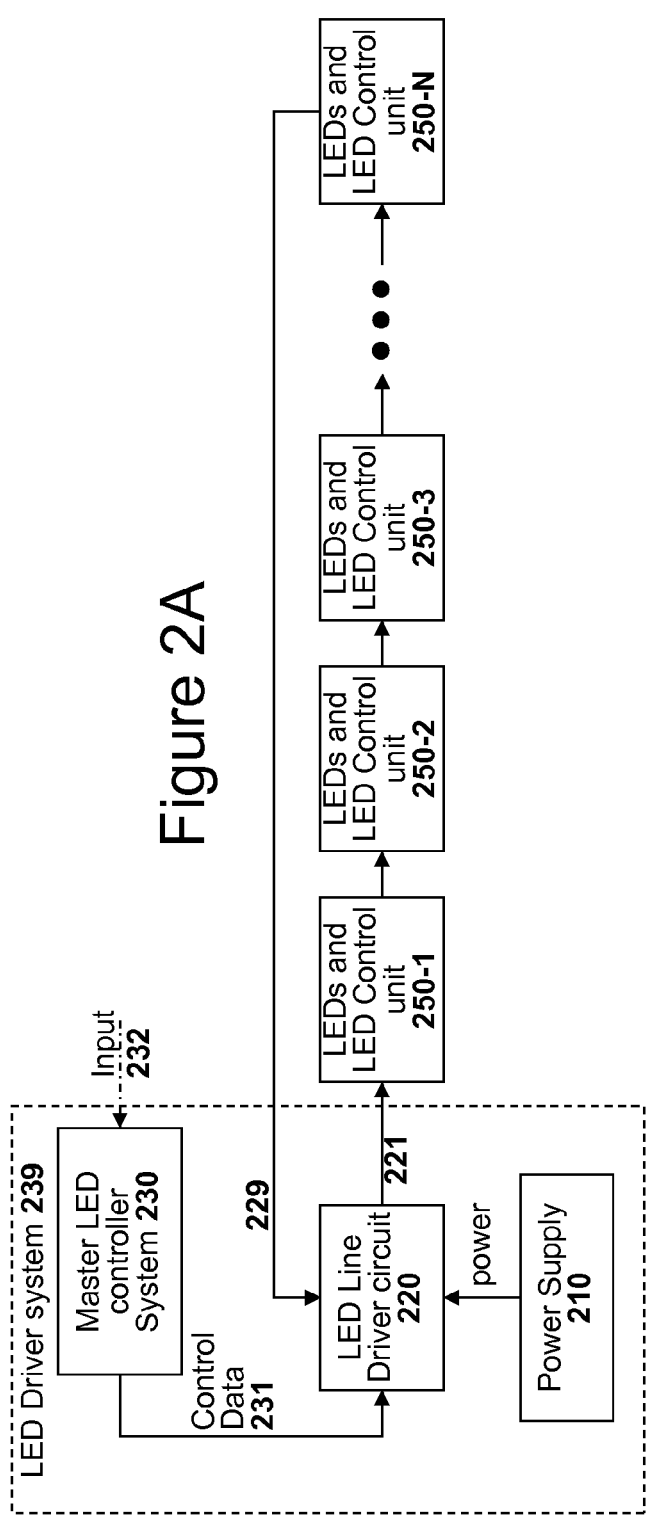
FIG. 2A illustrates a block diagram of the overall architecture of the single-wire multiple-LED control system of the present disclosure.
FIG. 2B illustrates an example data packet that may be sent to LED units.

FIG. 2A illustrates a block diagram of the overall architecture of the single-wire multiple-LED unit control system of the present disclosure. A LED line driver circuit 220 is situated at the head of a series of individually controlled LED units (250-1 to 250-N). In the example embodiment of FIG. 2A, the LED line driver circuit 220 receives electrical power from an external power supply circuit 210 that will be described in greater detail later in this document. The LED line driver circuit 220 also receives LED control data from a master LED controller system 230. (Note that although this document will refer to an 'LED line driver circuit', the line driver circuit can be used to send power and data to other types of circuits coupled to the driver line that perform other operations.)

The master LED controller system 230 provides detailed control data describing how the various LEDs on the individually controlled LED units (250-1 to 250-N) on the string should be powered on or off and the brightness of each powered on LED. (In one embodiment, each individually controlled LED unit has multiple LEDs of different colors such that the LED controller system 230 only supplies a color value and a brightness value.) The master LED controller system 230 can be any type of digital electronic system that provides LED control data 231 in the appropriate format to the LED line driver circuit 220.

The master LED controller system 230 may range from a simple single chip microcontroller to a sophisticated computer system that drives many LED strings in a coordinated manner. For example, in a relatively simple embodiment, the parts of a microcontroller implemented master LED controller system 230, the power supply 210, and the LED line driver 220 may be combined into a single LED Driver System 239 that controls a string of LED units 250. In a more sophisticated embodiment, an external computer system, such as computer system 100 illustrated in FIG. 1, can be programmed to output an appropriate LED control data signal to the LED line driver circuit 220 using signal generation device 118 or any other appropriate data output system.

In one particular embodiment, the well-known Serial Peripheral Interface (SPI) is used to provide LED control data 231 from the master LED controller system 230 to the LED line driver circuit 220. In this manner, many LED strings can be coupled to and controlled by a single master LED controller system 230 such as computer system 100. However, in alternate embodiments any other appropriate digital communication system such as the Universal Serial Bus (USB), Ethernet, or the IEEE 1394 interface (FireWire) may be used to provide LED control data to the LED line driver circuit 220. In an embodiment geared toward stage lighting applications, the data interface may be programmed to handle the well-known DMX512-A protocol used for controlling stage lighting. In such an embodiment, multiple LED line driver devices can be coupled in a daisy-chain arrangement for controlling multiple strings of independently controlled LED units.

Using the power received from the power supply 210 and the LED control data 231 from the master LED controller system 230, the LED line driver circuit 220 drives an electrical signal on a current loop (made up of line starting at 221 and returning at 229) that provides both electrical power and control data to the entire string of the individually controlled LED units (250-1 to 250-N). This system of providing both power and control data on a single wire greatly simplifies the design and construction of LED lighting and display systems. Furthermore, the use of a single wire to carry both power and control data significantly reduces the cost of constructing such a multiple LED display or lighting system. With the disclosed system, the single current loop (also referred to as the driver line) may serve seven or more different functions for the individually controlled LED units on the string such as: (1) electrical power for the LED units 250, (2) control and configuration commands to LED units, (3) LED output data, (4) a clock reference value used to generate a local clock signal, (5) a current reference value used to calibrate current output to LEDs, (6) heat dissipation, and (7) physical structure for supporting the individually controlled LED units (250-1 to 250-N). Details on each of the functions will be provided in later sections of this document.

FIG. 2B illustrates one possible embodiment of a data frame that may be modulated onto the driver line linking the individually controlled LED units (250-1 to 250-N). At the head of the data frame is a synchronization byte 291. Since there is no separate clock signal sent to the LED units 250, the synchronization byte is used by the LED units 250 to help lock onto the digital data signal and determine where each new data frame begins. Next, a command field 292 specifies a particular command to be executed by the recipient LED unit 250. An address field 293 specifies a specific address (or group of addresses) to select which of the LED units (250-1 to 250-N) will respond to the command. After the address field 293 is a data field 294 that contains a payload of data. Finally, an optional Cyclic Redundancy Check (CRC) code 295 may be used to help ensure data integrity.

Referring back to FIG. 2A, a number of individually controlled LED units (250-1 to 250-N) are coupled to the driver line (that starts at 221 and returns at 229) of the LED line driver circuit 220 in a series arrangement. Each individually controlled LED unit 250 comprises one or more LEDs, a LED controller circuit, and any additional components needed to complete the individually controlled LED unit 250. In one embodiment, the only additional electrical component needed is a capacitor to store a reservoir of power for driving the LEDs on the individually controlled LED unit 250. In other embodiments that handle greater amounts of electrical current, an external diode and a small heat sink may be used in addition to the capacitor used to store operating power. When there is more than one LED coupled to an individually controlled LED unit 250, each different LED on that LED unit 250 is referred to as a LED 'channel' on that LED unit 250.

A critical component on each of the individually controlled LED units (250-1 to 250-N) is a LED controller circuit. The LED controller circuit performs most of tasks required to intelligently control the various LEDs on an individually controlled LED unit 250. These tasks include obtaining power from the driver line 221 and storing that power in a local supply capacitor used to power the LED unit, generating the required regulated voltages to power the LED controller circuit, demodulating a data signal modulated onto the current, decoding the demodulated data signal to extract a data frame, executing commands received in the data frame, and driving the various LEDs to the specified brightness level.

The LED Line Driver Circuit

As set forth in the previous section, the LED line driver circuit 220 of FIG. 2A is responsible for providing both electrical power and LED control data to all of the individually controlled LED units (250-1 to 250-N) coupled in series to the LED line driver circuit 220 on the driver line that starts at 221 and returns at 229. To make LED lighting and display systems simple and inexpensive to construct, the LED line driver circuit 220 provides both electrical power and control data to all of the LED units 250 on the single driver line. This single-wire driver line greatly simplifies the construction of lighting and display systems that use large numbers of individually controllable lighting elements since those individually controllable lighting elements may be arranged in a simple daisy chain arrangement with a single wire coupling together each lighting element.

To provide electric power to the individually controlled LED units 250, the LED line driver circuit 220 functions as an electrical current source that drives a nominally constant direct current (DC) signal on the single driver line. Each of the individually controlled LED units (250-1 to 250-N) coupled to the driver line in a series arrangement will draw needed operating power from the nominally constant current driven on the driver line.

Figure 3:
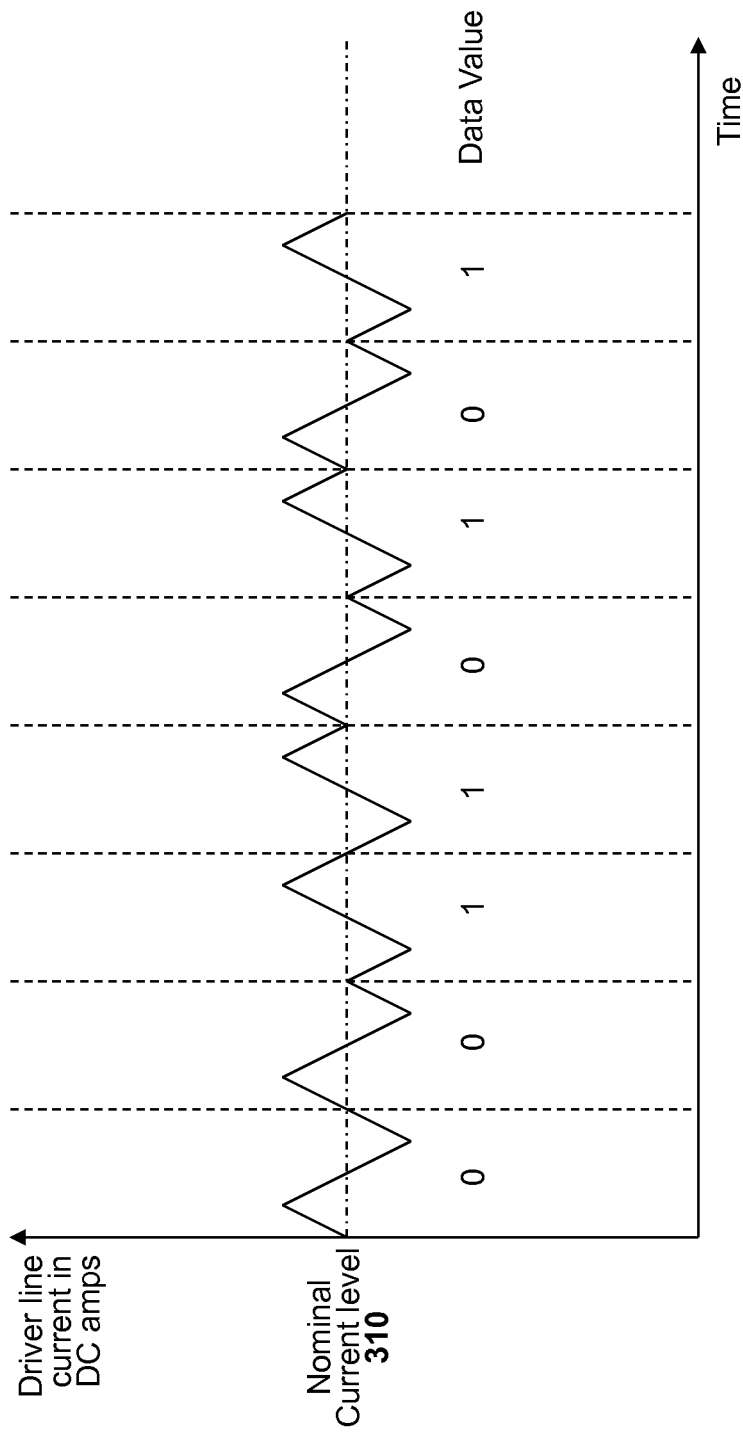
FIG. 3 illustrates a timing diagram that shows show digital information may be modulated as current deviations from a nominal current value.

To provide LED control data to all of the individually controlled LED units 250 on the string, the LED line driver circuit 220 modulates LED control data onto the electrical current driven on the driver line. In one particular embodiment, the LED control data is modulated onto the electrical current with small up and down spikes from the nominal constant current value. In such an embodiment, each data phase may be broken up into 2 cycles comprising either a positive spike of current followed by a negative spike of current or a negative current spike followed by a positive current spike. These two different data phase patterns are used to represent a one ("1") or a zero ("0") for a digital communication system. FIG. 3 illustrates an example current diagram graphically depicting the current on the single driver line controlled by the LED line driver circuit 220 as data is modulated onto the electrical current. In the example of FIG. 3, a zero ("0") is represented by a positive spike of current followed by a negative spike of current and a one ("1") is represented by a negative current spike followed by a positive current spike. In this embodiment, each data phase contains both a positive current spike and a negative current spike such that average current value on the line remains at a constant nominal current amount 310. Note that many other systems of modulating data onto the current level may be used.

Figure 4:
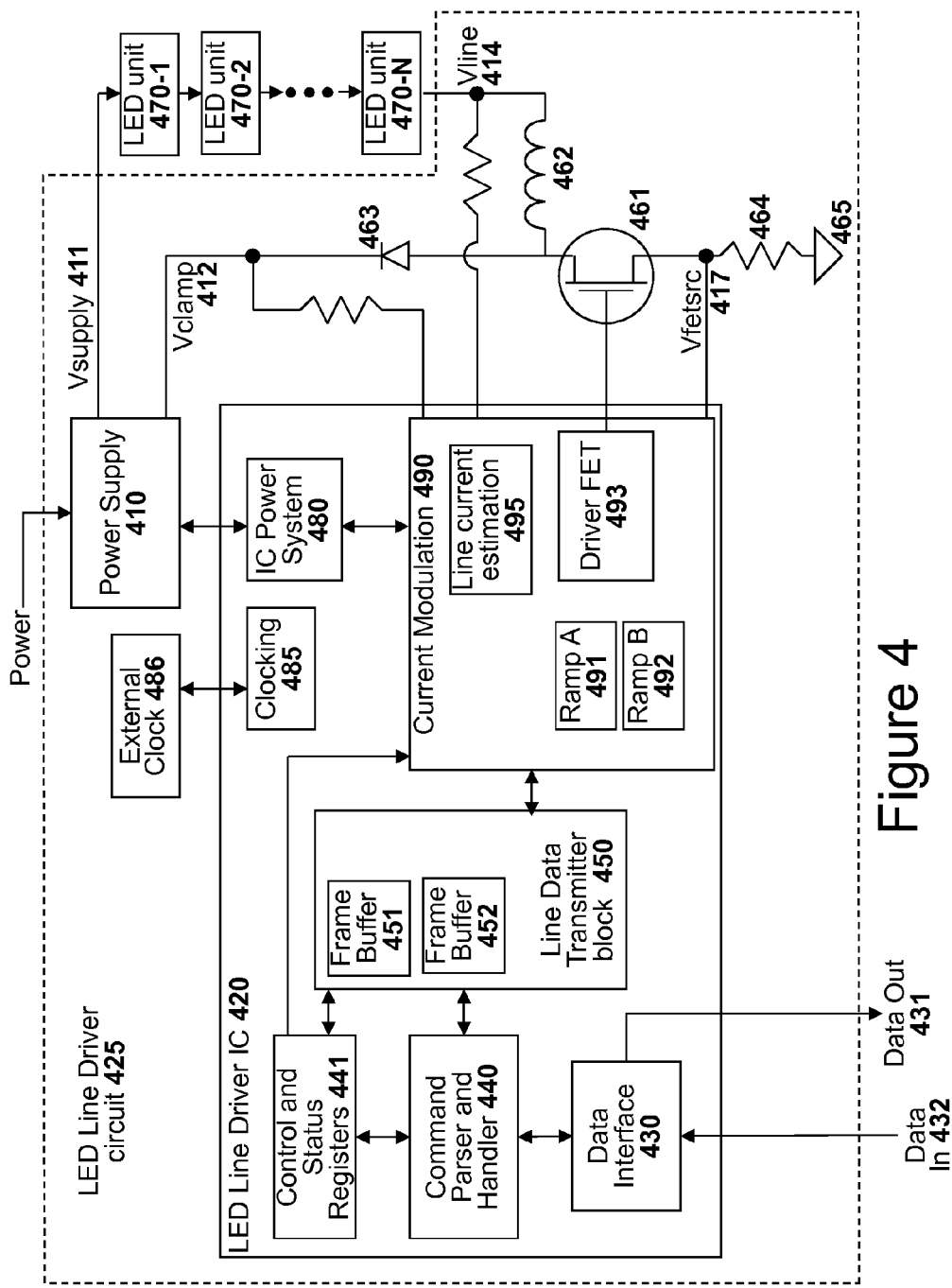
FIG. 4 illustrates the circuits of a LED line driver circuit in one embodiment.

FIG. 4 illustrates a block diagram of the internals of a LED Line Driver circuit 425 in one particular embodiment. The central component of the LED Line Driver circuit 425 is a LED Line Driver IC (integrated circuit) 420 that controls the overall operation of the LED Line Driver circuit 425. The LED line driver IC 420 includes a clocking circuitry block 485 to generate the needed clock signals for driving the digital circuitry. The clocking circuitry block 485 may receive input from an external clock 486 (or resonator) to generate the various needed internal clock signals. The clocking circuitry block 485 may contain a prescaler for reducing the speed of the clock signal from external clock 486 for the internal core clock generation, some synchronization logic to ensure that the chip's clocks properly start up after a power reset, and a timing generator for modulating data onto the driver line with the proper data rate.

Referring to the bottom left of the LED Line Driver IC 420 of FIG. 4, a data interface 430 receives control data from an outside controller such as the master LED controller system 230 illustrated in FIG. 2A. The data interface 430 extracts the incoming control data and passes that control data to a command parser and handler circuit 440. In a simple embodiment, the LED Line Driver IC 420 itself may include the circuitry for generating a pattern of LED control data such that no external master LED controller is required.

In one particular embodiment, the data interface 430 implements the well-known Serial Peripheral Interface (SPI) protocol. In such an embodiment, the implementation may include the standard Data In 432, Data Out 431, Data Clock (not shown), and Chip Select (not shown) pins typically used by the Serial Peripheral Interface (SPI) protocol. The operation of the SPI system will vary depending on the particular implementation. In a traditional SPI implementation, an external SPI master (such as master LED controller system 230 of FIG. 2A) sends data to the Data In 432 pin on each LED line driver IC 420 and specifies which LED line driver circuit(s) should act upon the data by activating the Chip Select Pins on their respective LED line driver IC(s). The SPI protocol is a two-way protocol such that individual LED line driver circuits can send back status information to the external SPI master system. One embodiment of the LED line driver circuit uses the return data path to return responses to status queries such as requests for calibration information and buffer status. In an alternate implementation of the SPI protocol, the Data Out 431 line could be coupled to the Data In interface on another LED line driver circuit in a daisy-chain arrangement such that a series of LED line driver circuits could be controlled by a single master LED controller system.

The Command Parser and Handler circuit 440 examines the incoming control data and reacts to the incoming control data appropriately. In one embodiment, the LED Line driver IC 420 handles three main types of incoming commands: configuration requests, status requests, and requests to pass data down the driver line to the individually controlled LED units coupled to the driver line. Configuration requests may instruct the LED Line driver IC 420 to set specified control registers in the Control and Status Registers block 441. Configuration requests may also instruct the LED Line driver IC 420 to burn non-volatile configuration fuses on the LED Line driver IC 420 such that permanent configuration information may be programmed onto the LED Line driver IC 420. Incoming status requests may request status information from the LED Line driver IC 420 such as its buffer status, operating status, and current configuration. Such status requests sent to the LED Line driver IC 420 may be handled by fetching information from the Control and Status Registers 441 and transmitting a response back to the master controller on the data out line 431.

Requests sent from a master LED controller to the LED Line driver IC 420 to pass LED control data down the driver line to the individually controlled LED units will generally make up the majority of the communication to LED Line driver ICs. The Command Parser and Handler circuit 440 will handle these LED control data passing requests by passing the LED control data to a Line Data Transmitter Block 450. The Line Data Transmitter Block 450 stores the control data into a frame buffer. In the embodiment of FIG. 4, the LED Line driver IC 420 contains two frame buffers (451 and 452) such that the LED Line driver IC 420 may receive incoming LED control data from the master LED controller into a first frame buffer while simultaneously modulating LED control data from the second frame buffer onto the driver line. The frame buffers (451 and 452) temporarily store LED control data destined for one or more individually controlled LED units (470-1 to 470-N) coupled to the driver line.

In some embodiments, the LED units 470 may communicate back to the LED Line driver IC 420. For example, a LED unit 470 may be able to signal back to the LED Line driver IC 420 by turning its shunt transistor on and off during a designated time slot such that the effect would be detectable by the LED Line driver IC 420. In such embodiments, an incoming status request message on Data In 432 may request status from individually controlled LED units 470 coupled to the driver line. The Command Parser and Handler circuit 440 would then translate this LED unit status request into a second status request message that is then given to the Line Data Transmitter Block 450 and modulated onto the driver line. When a response is received from the LED unit 470 the LED Line driver IC 420 may then send a corresponding response message on the data out line 431.

The Line Data Transmitter Block 450 is responsible for transmitting LED control data (and status requests in some embodiments) onto the driver line to the LED units 470. The Line Data Transmitter Block 450 takes the control data (or status request) passed to it from the Command Parser and Handler circuit 440 and fills the next available frame buffer. In one embodiment, the Line Data Transmitter Block 450 block is capable of calculating an optional frame Cyclic Redundancy Check (CRC) byte if a control register 441 specifies that this should be done. In one embodiment, when the Line Data Transmitter Block 450 has no pending LED control data (or status) to modulate onto the driver line, then the Line Data Transmitter Block 450 will modulate an idle data frame onto the driver line. The idle data frame will be ignored by all of the individually controlled LED units 470 but will help those individually controlled LED units 470 maintain synchronization with the data stream being modulated onto the driver line.

The Line Data Transmitter Block 450 passes formatted data frames from the frame buffers (451 and 452) to the Current Modulation Block 490. The Current Modulation Block 490 is responsible for modulating a (nominally) constant direct current signal on the driver line to provide a stream of data to the LED units 470 on the driver line. Specifically, the Current Modulation Block 490 modulates the electrical current by inducing small sharp increases and decreases of the electrical current in order to transmit LED control data down the driver line to control the LED units 470. In one embodiment, the Current Modulation Block 490 accomplishes this goal by controlling an external transistor 461 that biases an inductor 462 on the driver line.

Before discussing the Current Modulation Block 490 in greater detail, a review of electrical power sources is useful. Most electronic circuits are constructed using a voltage power source as an electrical power source to power the electronic circuits. An ideal voltage source is a conceptual mathematical model that is capable of generating infinite current at a particular designated voltage level to drive a load circuit and has zero internal resistance. Of course real world voltage sources, such as batteries and DC power supplies, are unable to generate infinite current and have non zero internal resistance. However, as long as the load circuit powered by a real world voltage source does not exceed the current capacity of the real world voltage source and a non-zero internal resistance is added in series with load circuit, an ideal voltage source can be used for circuit modelling a voltage source.

A current source is a much lesser used method for modelling an electrical power source when designing electronic circuits. An ideal current source is a mathematical model of an electrical power source that is capable of generating infinite voltage at a specified current level to drive a load circuit and has infinite internal resistance. Again, no real world current source is capable of providing infinite voltage nor will it have infinite resistance. But as long as the load circuit driven by a real world current source does not have too high of a total resistance that would require very high voltage values, a real world current source can be modelled as an ideal current source with a non-infinite internal resistance in parallel with the ideal current source (a circuit known as the Norton equivalent circuit). The present disclosure uses a current source as the power source model. Specifically, the Current Modulation Block 490 of the LED line driver IC 420 and the supporting external circuitry keep the electrical current on the driver line around a specific nominal current value with small increases and decreases of current away that nominal current value used to modulate data onto the electrical current.

Referring back to FIG. 4, an external power supply 410 generates electrical current that is transmitted down a driver line through the LED units 470. The output voltage (labeled as Vsupply 411) of the external power supply 410 at the head of the driver line is at a voltage potential above what is needed by the sum of all the LED units 470 on the driver line. After passing through all of the LED units 470 on the driver line, the driver line current passes through an inductor 462 and a field effect transistor (FET) 461 to ground. The Current Modulation block 490 carefully modulates the current level on the driver line by controlling the inductor 462 using FET 461. Note that the FET 461 will generally be implemented externally from the LED line driver IC 420 since the FET 461 must be able to handle relatively high voltage potentials that cannot easily be handled within an ordinary CMOS semiconductor.

Figure 5B:
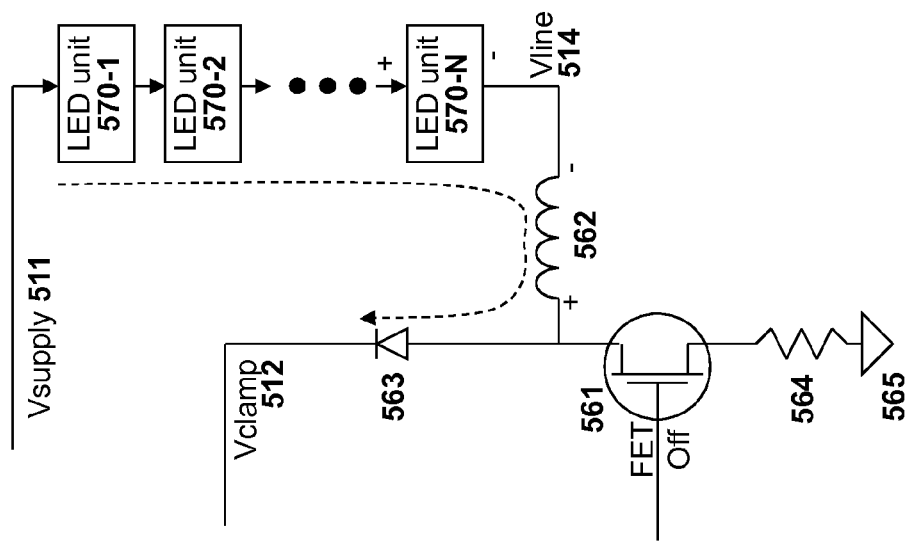
FIG. 5B illustrates how having the LED line driver turning off an external field effect transistor allows the line current to ramp downward.
Figure 5A:
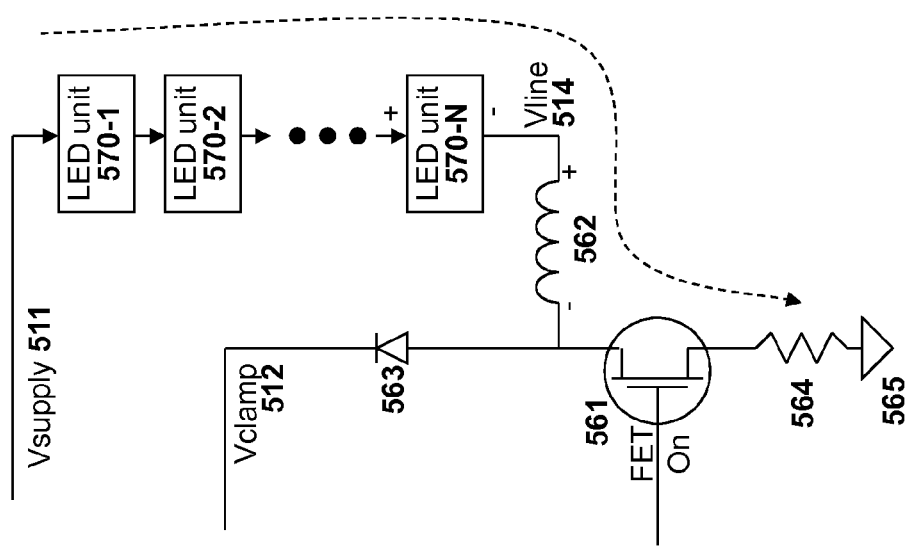
FIG. 5A illustrates how having the LED line driver turning on an external field effect transistor allows the line current to ramp upward.

Referring back to driver line electrical current diagram of FIG. 3, the electric current on the driver line may be modulated around a nominal constant current value 310. In the specific embodiment of FIG. 3, the FET 461 modulates the electric current with small up and down current variations above and below the nominal constant current value 310 used to modulate data onto the driver line. FIGS. 5A, 5B, and 5C illustrate in detail how one embodiment of the LED line driver controls inductor 562 using FET 561 to modulate the current around the designated nominal current value 310. Note that current control circuits other than a FET may be used instead. Furthermore, other types of current deviation patterns may be used. For example, in one embodiment the FET modulates specifically timed current dips away from the nominal constant current value 310 instead of up and down current ramps.

In a steady state direct current (DC) circuit, an inductor acts as a short circuit with no effect on the steady state direct current circuit. However, when in a state of change, an inductor resists current level changes. Thus, when current passing through an inductor is being increased, that inductor will slow the increase of current by storing energy in a magnetic field. Similarly, when current passing through an inductor is being decreased, that inductor will resist the decrease in current by using the energy stored in the magnetic field to supplement the slowing current.

Referring to FIG. 5A, when a LED line driver 425 is initially turned on, that LED line driver will turn on FET 561 to allow electrical current to flow from Vsupply 511 down through all the LED units 570 on the string, through inductor 562, through FET 561 (which controls the current), and finally through resistor 564 to ground 565 of the power supply. This electrical path from the Vsupply 511 of the external power supply to the ground 565 of the external power supply is referred to as the current loop. Note that after inductor 562 there is a circuit branch that passes through diode 563 to a second voltage source Vclamp 512. The Vclamp 512 voltage source may be created by from a power supply or through other circuitry. However, current will not flow towards Vclamp 512 when the FET 561 is turned on since Vclamp 512 will be at a voltage potential higher than ground 565.

When FET 561 is initially turned on, the electrical current will increase on the driver line as illustrated in FIG. 5C. However, the increase in electrical current will be slowed by inductor 562 that will resist a rapid current increase by storing energy in a magnetic field. Thus, the current on the driver line will ramp upwards during a start-up phase 521 in FIG. 5C. Note that there will be voltage drop across the inductor 562 during this time as indicated by the "+" and "−" symbols on FIG. 5A. The LED line driver IC 420 will keep the FET 561 turned on during start-up phase 521 thus allowing the current level on the driver line to increase until the current exceeds the designated nominal current level 510 by a specified amount as illustrated on FIG. 5C.

Once the current flowing on the driver line exceeds the designated nominal current level 510 by a specified amount, the LED line driver IC 420 will turn off FET 561 as depicted in FIG. 5B such that the line current can no longer flow through FET 561 toward the ground 565 of the power supply. However, the inductor 562 will resist a rapid change in current flow and instead cause the current to begin ramping downward as illustrated by current drop 531 in FIG. 5C. Since the current can no longer flow through FET 561 to ground 565, the slowing current will instead flow in the branch circuit through diode 563 toward Vclamp 512 as illustrated in FIG. 5B which depicts the flow of current when the FET 561 has been turned off. This will occur even though Vclamp 512 is at a higher voltage than Vsupply 511 since inductor 562 will use energy in its magnetic field to continue driving the current.

Although the current will begin to ramp downward just due to the fact that the FET 561 has been turned off, a downward current ramp due only to turning off the FET 561 would be relatively slow. (Slow relative to the upward ramping of current when the FET 561 is turned on, thus creating an asymmetry between the upward and downward current ramps.) To accelerate the downward ramping of line current and thus cause the upward and downward current ramps to approximately match, Vclamp 512 may be set to a higher voltage potential than Vsupply 511 such that a reverse voltage bias will be placed across inductor 562 (as indicated by the "+" and "−" symbols across inductor 562 in FIG. 5B) thus accelerating the downward ramp of current.

Referring to FIG. 5C, once the current 531 drops more than a specified amount below the designated nominal current value 510, the LED line driver will turn on the FET 561 (reverting back to the state of FIG. 5A) to allow the current to ramp back upward as illustrated by current rise 532. The LED line driver IC 420 does not allow the current on the driver line to reach a final steady state of direct current. Instead, it will continually turn the FET 561 on and off to keep the current on the driver line around the desired nominal current level 510.

By turning the FET 561 on and off, the LED line driver IC 420 can modulate the amount of current flowing on the driver line in relatively steady upward and downward ramps. By turning the FET 561 on and off in a manner correlated with control data, the LED line driver IC 420 can modulate control data as current patterns on the driver line as illustrated by the data phase 522 of FIG. 5C. Note that when a LED line driver IC 420 lacks any commands that it needs to modulate onto the driver line, then LED line driver IC 420 will then modulate empty packets onto the driver line. In this manner, various LED units on the driver line will be able to maintain synchronization with the data stream modulated by the LED line driver IC 420.

Referring back to FIG. 4, the current modulation block 490 receives data frames from the Line Data Transmitter Block 450 to modulate onto the driver line as patterns of current change spikes. As set forth above, the Current Modulation block 490 may accomplish this task by either turning on external FET 461 (which allows current to ramp upward by allowing the current to pass to the ground 465 of the power supply 410) or turning off external FET 461 (which ramps current downward by applying a reverse bias across inductor 462 using the voltage from VClamp 412). The Current Modulation block 490 may control the external FET 461 by controlling its own internal driver FET 493. In one embodiment, the internal driver FET 493 is designed to handle 10 volt swings in order to be able to control the larger external FET 461 that is directly responsible for controlling the current on the driver line.

Transformer Based Clamp Circuitry

In the application embodiment of FIG. 4, an external power supply 410 is used to generate the VClamp 412 voltage that is used to reverse bias the inductor 462 on the driver line. However, requiring the external power supply 410 to generate the VClamp 412 voltage may complicate the design of the power supply 410. Furthermore, the VClamp 412 branch circuit must sink the current from inductor 462 when external FET 461 is turned off but power supply circuits are generally built to source current, not to sink current. Therefore, it would be desirable to have alternative designs for creating the VClamp 412 voltage that is used to reverse bias the inductor 462 on the driver line.

Figure 6:
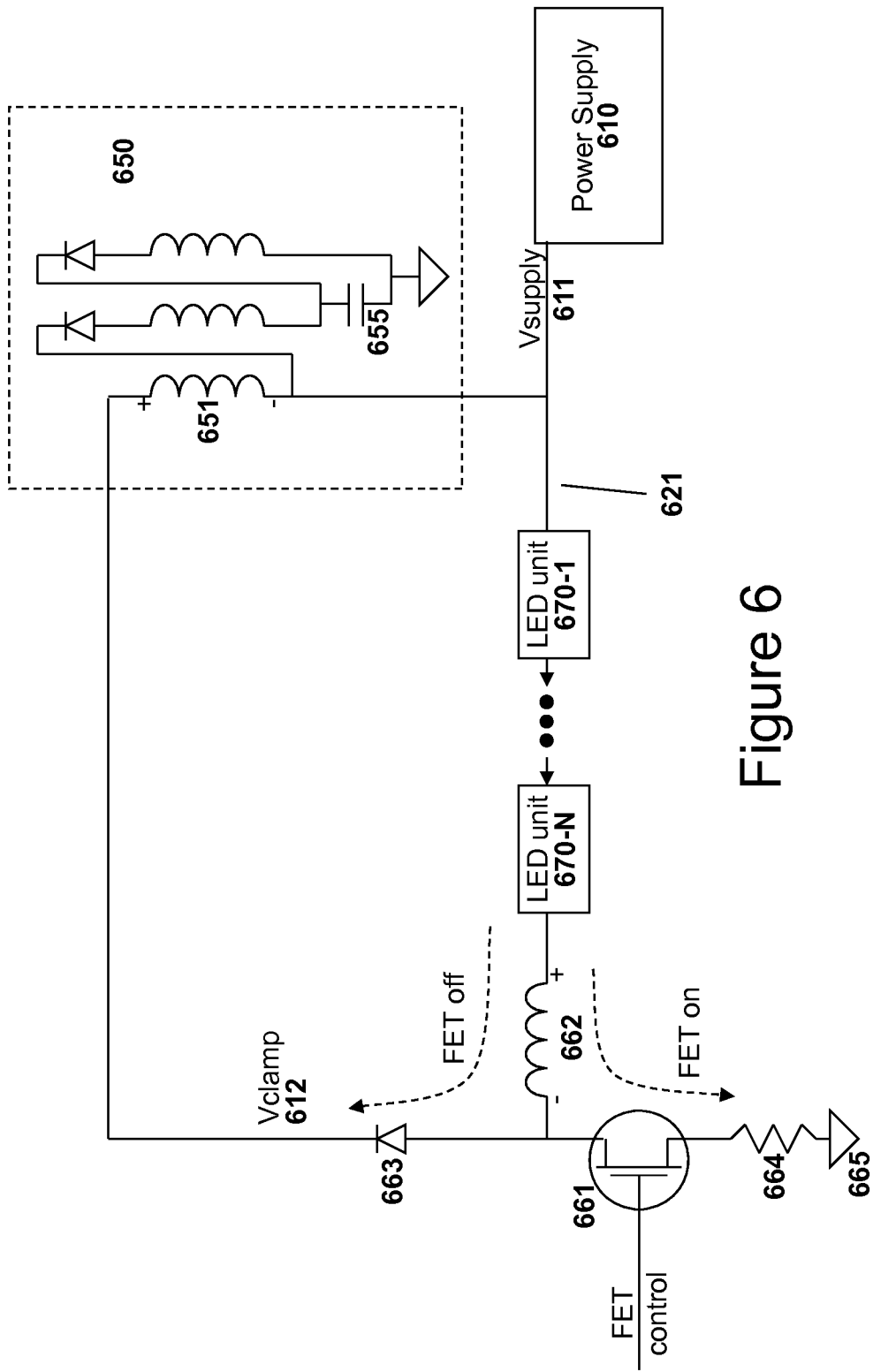
FIG. 6 illustrates a transformer-based electrical circuit for catching excess current and for creating a voltage that may be used to reverse bias an inductor.

FIG. 6 illustrates a first embodiment of an electrical circuit 650 designed to create the VClamp 612 voltage that may be used to reverse bias the inductor 662 on the driver line 621. In the embodiment of FIG. 6, a transformer-based circuit 650 is used to create the VClamp 612 voltage. The goal of the transformer-based circuit 650 is to sink excess current and ensure that the desired VClamp 612 voltage for reverse biasing the inductor 662 is present when the FET 661 used to control the current on the driver line 621 is turned off. When the main FET 661 is on, the VClamp 612 voltage may be at or near ground. Since the current on driver line 621 passing through the inductor 662 is always in one direction (from power supply 610 to ground 665), when the main FET 661 is turned off the driver line current flows through diode 663 and into the circuit 650 for generating the VClamp 612 voltage.

The circuit 650, referred to as a 'catch circuit', is used to create a biasing voltage VClamp 612. In the embodiment of FIG. 6, when the main FET 661 turns off, the current from inductor 662 flows through the diode 663 into the first winding 651 of the transformer and then to the Vsupply 611 from power supply 610. The transformer in the catch circuit 650 creates a VClamp 612 voltage of around 1.5 times the Vsupply 611 voltage from power supply 610. The created VClamp 612 voltage is limited by the other windings dumping into a Vsupply/2 voltage level at the midpoint capacitor 655, and from the midpoint capacitor 655 into the Vsupply 611 voltage from power supply 610. The created VClamp 612 voltage reverse biases the inductor 662 and thus slows downward current ramps as desired. Once the main FET 661 turns back on, the magnetizing current dumps back through the diode 663 into to ground via the FET 661 until the transformer core in the catch circuit 650 is demagnetized. Having catch circuit 650 simplifies the task of creating power supply 610.

In an alternate embodiment, a two winding transformer with a secondary winding that is two times the primary winding may be used. However, with such an alternate embodiment the catch circuit may increase capacitance and leakage inductance. Both of these effects may have detrimental effect on the catch circuit operation.

In other embodiments, additional transformer windings may be used. With more transformer windings VClamp 612 may be created to be 1.33 or 1.25 times the Vsupply 611 voltage from power supply 610. However, the VClamp 612 voltage level of 1.5 times Vsupply 611 voltage works well and is a simpler system. To reduce the implementation cost of catch circuit 650, a VSupply capacitor (not shown) within the power supply 610 may be used to implement capacitor 655. Specifically, the VSupply capacitor (not shown) within the power supply 610 may be split and then the center tap of the VSupply capacitor may be used for capacitor 655.

The transformer-based circuit 650 for creating the VClamp 612 voltage has a few disadvantages. For example, there is some loss of energy due to the core loss from the transformer within circuit 650. Furthermore, it is very desirable to have an accurate driver line current level near the FET 661 that can easily be measured by the modulation circuitry used to control the FET 661. With the transformer-based catch circuit 650 of FIG. 6, the current waveform near the FET 661 will include effects from the discharge of the magnetizing current from inductor 651. Thus, an electrical current measurement near FET 661 will not provide an accurate representation of the electrical current on driver line 621 as experienced by the LED units 670. Having an inaccurate representation of the electrical current on driver line 621 may greatly impair the proper operation of the current modulation system 490 in the line driver IC 420.

Diode Based Clamp Circuitry

Figure 7A:
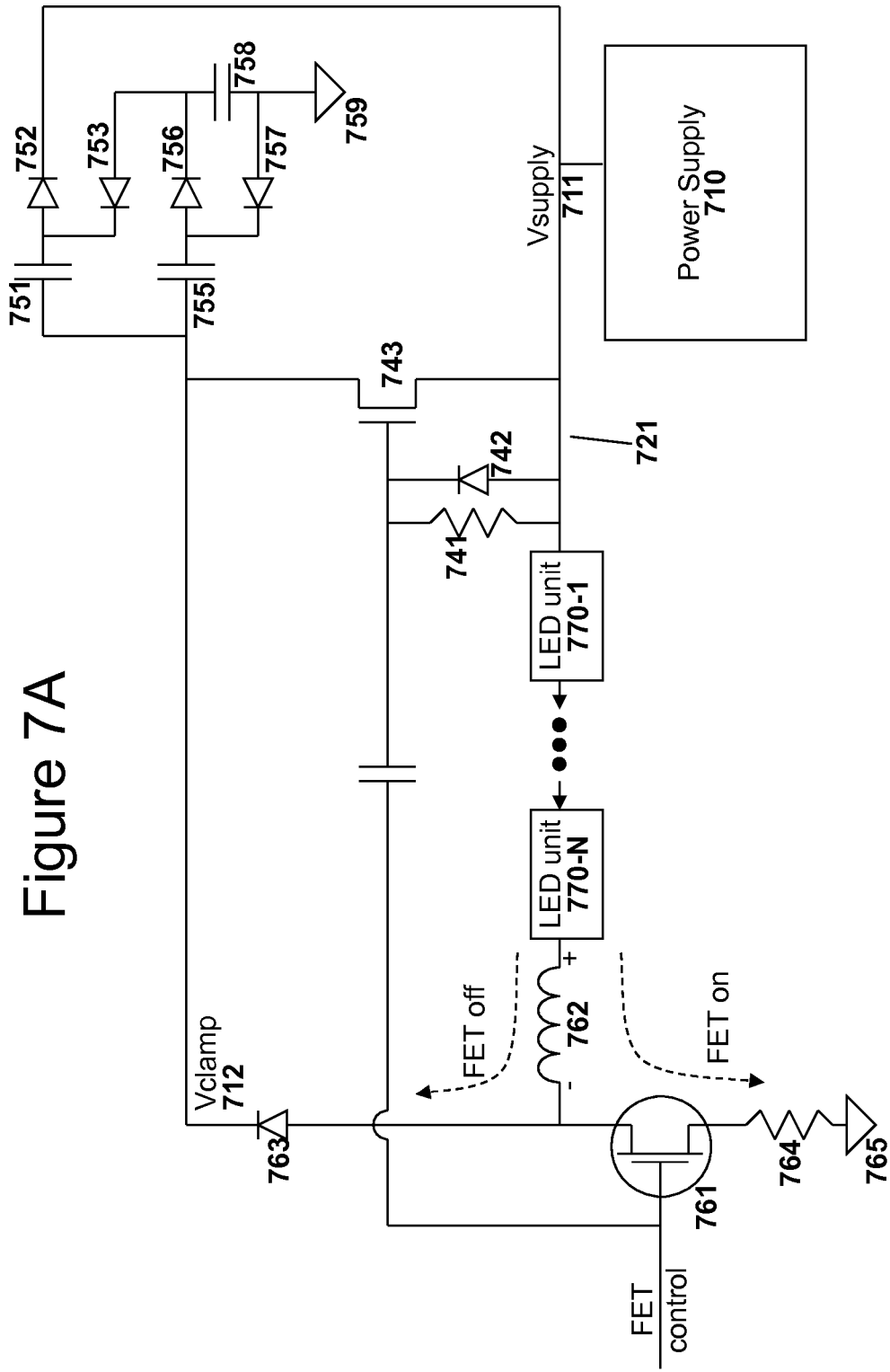
FIG. 7A illustrates a first embodiment of a diode-based electrical circuit for catching excess current and for creating a voltage that may be used to reverse bias an inductor.

Instead of using a transformer-based catch circuit 650 as illustrated in FIG. 6, a diode-based catch circuit may be implemented to handle the excess current from the inductor and generate the needed Vclamp voltage level. FIG. 7A illustrates a first embodiment of a diode-based catch circuit for creating VClamp 712 voltage level used to reverse bias inductor 762.

Referring to FIG. 7A, when the current modulation system turns off the main FET 761, the excess line current from inductor 762 will then flow through diode 763 into two capacitor paths of the diode-based catch circuit. Along a first capacitor path, the current flows into a capacitor 751 through a diode 752 toward the Vsupply 711 voltage from power supply 710. Along a second capacitor path, the current flows into a capacitor 755 through a diode 756 and into Vsupply/2 voltage capacitor 758. The current from inductor 762 charges up capacitor 751 and capacitor 755 to create the VClamp 712 voltage that is used to reverse bias inductor 762.

Capacitor 751 and capacitor 755 would continue charge up and the VClamp 712 voltage level would steadily increase except that when the current modulation system turns the main FET 761 back on, the current modulation system also turns on an auxiliary FET 743 using the same gate drive signal (except level shifted). When the main FET 761 is turned back on, the auxiliary FET 743 drives the VClamp 712 voltage back down to the Vsupply 711 voltage level by connecting VClamp 712 to the Vsupply 711 voltage through auxiliary FET 743. Thus, the diode based catch circuit uses capacitors to drive VClamp 712 up to 1.5 times Vsupply 711 when FETs 761 and 743 are turned off but returns VClamp 712 back to the Vsupply 711 voltage level when FETs 761 and 743 are turned back on.

As with the transformer-based catch circuit 650 from the previous section, additional capacitor and diode sections may be used to reduce the VClamp 712 biasing voltage (for example to 1.33 or 1.25 times Vsupply instead of 1.5 times Vsupply) and thereby reduce some energy losses. However, in the embodiment of FIG. 7A, the voltage at VClamp 712 only swings between Vsupply and 1.5*Vsupply which is one third of the voltage swing of the main FET 761 (which swings from near ground to 1.5*Vsupply). Thus, the switching losses ($CV^2$ losses) on the additional auxiliary FET 743 are only one ninth of the switching losses of the main FET 761 such that there is only a relatively minor amount of loss.

In one embodiment, some of the energy within the main FET 761 is recycled to reduce the catch circuit's energy usage. Specifically, the control circuitry may be modified to turn on the auxiliary FET 743 before turning on the main FET 761. In this manner, the $CV^2$ energy stored within the main FET 761 is partially dumped into the Vsupply 711 voltage from power supply 710 before the main FET 761 turns on and burns the remainder as heat.

Figure 7B:
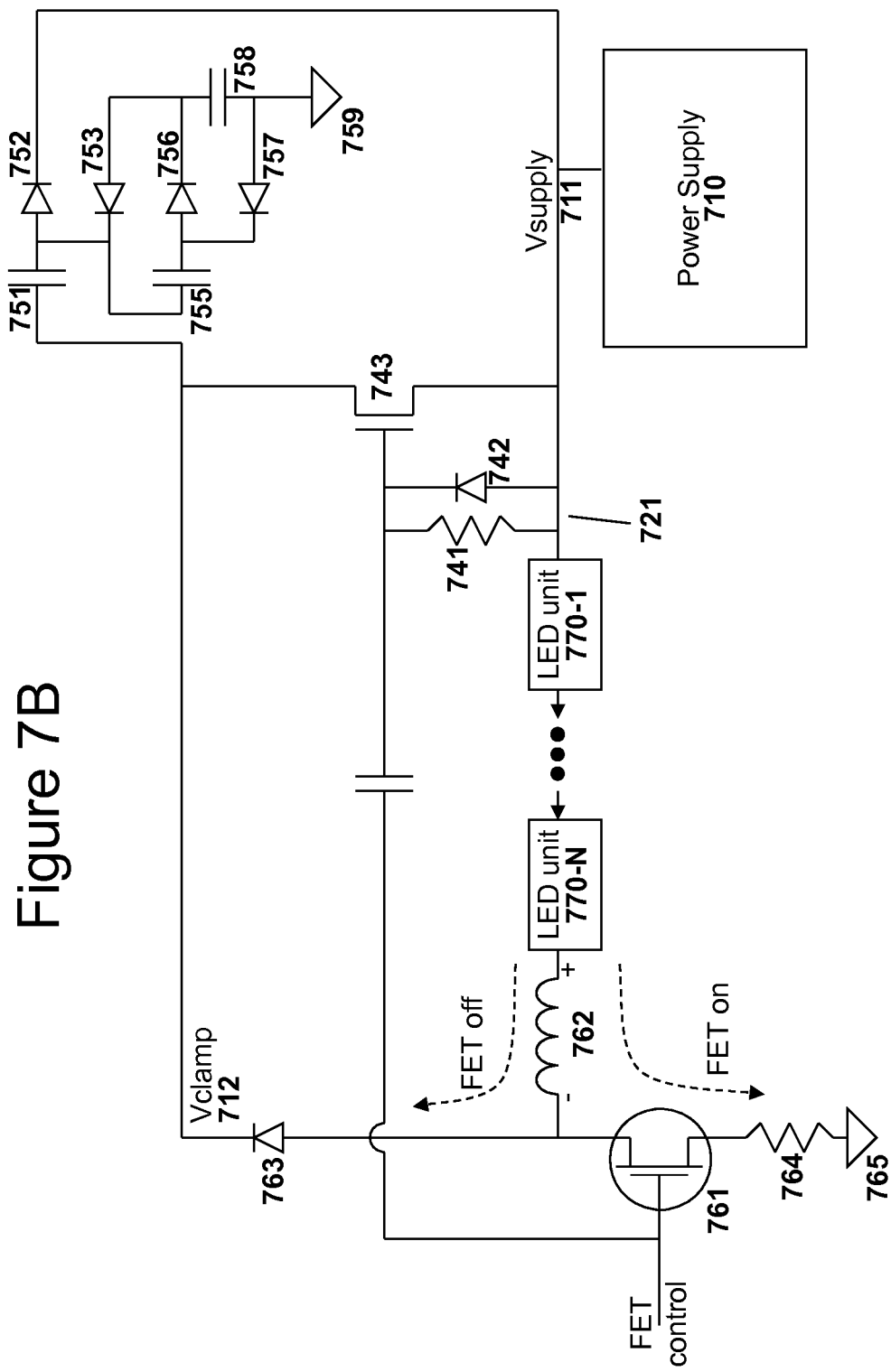
FIG. 7B illustrates a second embodiment of a diode-based electrical circuit for catching excess current and for creating a voltage that may be used to reverse bias an inductor.

FIG. 7B illustrates an alternate embodiment of a diode-based catch circuit that may reduce the cost of implementing the diode-based catch circuit. In the embodiment of FIG. 7B, capacitor 751 and capacitor 755 are arranged in a series configuration. By placing the two capacitors (751 and 755) in a series configuration, the voltage rating of the second capacitor in the series (capacitor 755) can be cut in half while only requiring a modest increase in the capacitance of capacitors 751 and 755. Switching to a lower voltage rating while modestly increasing the capacitance allows lower-cost capacitors to be used and thereby reduce the cost of the catch circuit. As with the transformer-based catch circuit 650, a VSupply capacitor (not shown) within the power supply may be used to implement a capacitor for the diode-based catch circuit. Specifically, a VSupply capacitor (not shown) within the power supply 710 may be split and then the center tap of the VSupply capacitor may be used for capacitor 758. Thus, with one or both of these changes, the catch circuit implementation of FIG. 7B may cost less than the implementation of FIG. 7A.

The diode-based catch circuit implementations of FIGS. 7A and 7B provide significant improvements over the transformer-based catch circuitry 650 illustrated in FIG. 6. For example, the diode-based catch circuitry is more efficient at recycling the energy than the transformer-based catch circuitry. Specifically, even though there are more diode losses in the diode-based catch circuitry (since there are 5 diode drops instead of just 3 diode drops in the transformer-based catch circuit), the additional diode losses are more than offset by the removal of the more significant transformer core losses. Furthermore, the diode-based catch circuitry of FIGS. 7A and 7B provides a more accurate reflection of the electrical current on driver line 621 that is being passed through the LED units 670. Specifically, with the transformer based catch circuitry 650, the first winding 651 will still have some effects on the line current near the main FET 661 even when the main FET 661 is turned back on whereas the diode based catch circuit in FIGS. 7A and 7B will not affect the line current near the main FET 761 at all.

The Individually Controlled LED Unit

As set forth in FIG. 2A, the LED line driver circuit 220 drives a modulated current source on driver line 221 that is coupled to one or more individually controllable LED units (250-1 to 250-N). The only means of electrical contact to a LED unit 250 is through that single driver line 221. Thus, a LED unit 250 must receive all the resources the LED unit 250 needs to operate from that single driver line 221. To accomplish this, the driver line 221 serves multiple functions for the LED units 250. Each of the LED units (250-1 to 250-N) draws its needed operating power from the electrical current on driver line 221. Each LED unit also demodulates LED control data modulated onto that electrical current by LED line driver circuit 220. In one embodiment, each LED unit 250 also uses the nominal electrical current level of the driven on the single driver line 221 as a current reference value. This section describes the internals of the LED units 250 in greater detail.

Figure 8:
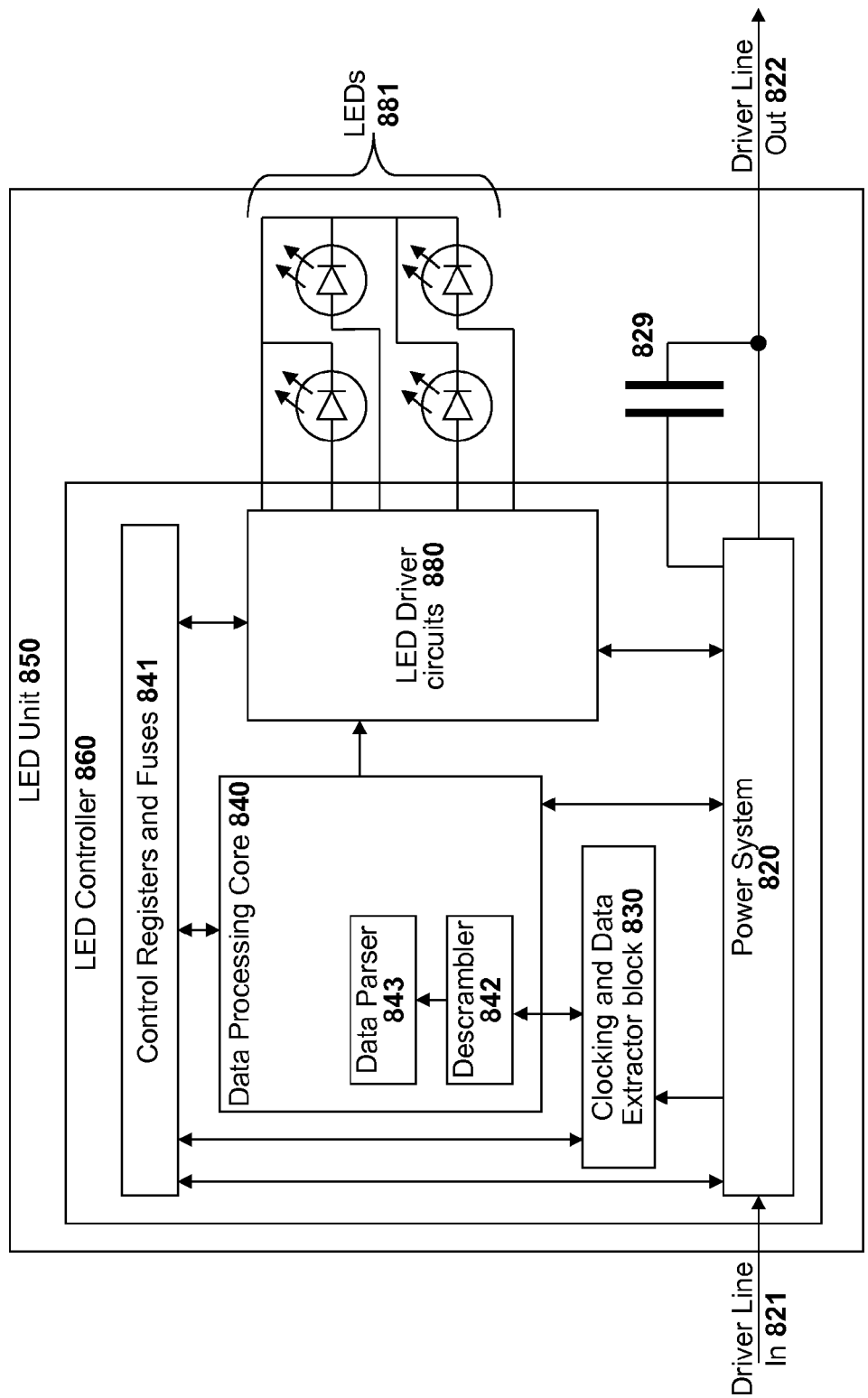
FIG. 8 illustrates one embodiment of an individually controllable LED unit.

FIG. 8 illustrates a block diagram of one embodiment of an individually controllable LED unit 850. In the particular embodiment illustrated in FIG. 8, the LED unit 850 is made up of a LED controller 860, four light emitting diodes (LEDs) 881, and a supply capacitor 829. The supply capacitor 829 captures, stores, and supplies operating power to the LED unit 850. The LED controller 860 may be an integrated circuit that provides most of the functionality of the LED unit 850.

The LED unit 850 is coupled to an upstream LED line Driver circuit (such as the LED line driver 425 illustrated in FIG. 4) through driver line input 821. Specifically, the driver line input 821 provides a modulated electrical current source to a power system 820 on the LED controller 860.

The fourth function of the power system 820 is a line shunting operation performed by a line shunt and line current rectifier section that is digitally set to shunt line current to the driver line out 822 or charge the supply capacitor 829. In normal operation, the power system 820 will periodically unshunt the line current such that current is directed to recharge the supply capacitor 829. This unshunting may be performed in a manner coordinated with other LED units coupled to the same driver line such that not too many LED units are simultaneously attempting to draw power current from the driver line.

The power system 820 unshunting of the driver line 821 to charge the supply capacitor 829 is a very critical function for the LED controller 860 since the charging of the supply capacitor is required to obtain the electrical power required to operate the LED controller 860. Similarly, the shunting of the driver line 821 after supply capacitor charging is also very critical since if the power system 820 fails to quickly shunt the current to the output driver line 822 when the supply capacitor 829 is fully charged, then the LED controller 860 may malfunction due to excessive voltage that breaks down the integrated circuitry of the LED controller 860. Thus, the shunting and unshunting of the input driver line 821 is a task that requires careful control by power system 820.

Instead of using the current strength to control the brightness of an individual LED, the brightness of a LED is typically controlled by controlling a timed on/off duty cycle of a constant current amount. One well-known system of implementing this technique for controlling power is generally known as "pulse width modulation" since the brightness of the LED is proportional to the width of constant current strength pulses during a defined time period. In one embodiment, the system of the present disclosure uses a different technique wherein both the number of constant current pulses and the width of those constant current pulses during a defined time period are modulated to obtain the desired brightness.

Referring back to FIG. 8, after obtaining a proper lock onto the data rate and properly aligning with the data bit centers, the clocking and data extractor block 830 passes the demodulated data stream to the data processing core 840. The data processing core 840 is a block of digital logic that processes the incoming LED control data. In one embodiment, the data processing core 840 is responsible for identifying individual data frames; parsing the data frames to obtain LED controller configuration commands, LED control commands, and LED parameter data; and then executing the commands extracted from the LED control data.

In one embodiment, the first action performed by the data processing core 840 on incoming LED control data is descrambling of the data stream. The data stream encoded onto the driver line 821 may be scrambled for various different reasons.

One reason for scrambling is to prevent the LED unit 850 from locking to the wrong data framing signal. If a LED control data value repeatedly sent to a particular LED unit 850 happened to be the same as the framing synchronization header value, then the LED controllers might lock to the wrong place of the data stream and never see valid data frames. Scrambling of data prevents this situation since even if the data payload is a fixed value, the data scrambling causes it to be different on the driver line each data frame. Thus, the data scrambling greatly reduces the probability of creating false framing patterns in the data stream. Another reason to scramble the data is to reduce electromagnetic interference issues since the scrambling of the data spreads out the energy. To handle the scrambled data stream, a descrambler unit 842 in the data processing core 840 initially processes the incoming data by looking for frame synchronization markers and then descrambles the scrambled data frame to obtain the actual data commands in the data frame.

In one particular embodiment, a LED control data frame consists of 40 bytes as illustrated in FIG. 2B. The following table illustrates the structure of the example data frame illustrated in FIG. 2B:

TABLE 1

Example Data Frame

| Name | Byte Position | Function/Value |
| --- | --- | --- |
| StartFrame | [0] | This is the 'start frame' synchronization indicator for the state machines to lock onto. This value is not scrambled. |
| Cmd | [1] | The command which is being sent to the LED controller. |
| Addr | [2] | The LED controller address associated with the frame. This address is used to select which LED units on a driver line will respond to the command in this data frame |
| Payload | [38:3] | 36 byte payload. For LED control commands, this data payload is the parameter data associated with individual pixels and may be 4, 6, 8, or 12 bits wide. For LED controller configuration commands, the payload data may identify fuses or control registers to be changed. |
| CRC | [39] | A CRC check, which can be enabled to improve immunity to any erroneous commands. |

Referring to the preceding table, the first byte is a frame header used to indicate the start of a data frame. The frame header byte is not scrambled and the remaining thirty-nine (39) bytes may be scrambled using a v.34 self-synchronizing scrambler. The data frame detection logic of the descrambler unit 842 searches the incoming data for a repeating frame header in the data stream. The descrambler unit 842 attempts to lock onto that pattern. If no data frame is found after a certain amount of time then the descrambler unit 842 will inform the clocking and data extractor block 830 of the problem. The clocking and data extractor block 830 may then switch to a new frequency and assert a resynchronize signal. This action will reset any possible frame locks that might have been started and start the frame detection logic of the descrambler unit 842 searching for a data frame once again.

When the frame detection logic of the descrambler unit 842 detects a data frame pattern, the descrambler unit 842 will assert a valid frame signal back to the clocking and data extractor block 830 to indicate valid data. In one embodiment, the descrambler unit 842 is active at least one frame before the data parser block 843 gets valid data to make sure that the descrambler unit 842 has locked onto the incoming data stream and has the proper output data. This ensures that the descrambler unit 842 has synchronized with the incoming data stream. Once the descrambler unit 842 has obtained a proper lock on the incoming data and completed descrambling processing, the descrambler unit 842 passes the descrambled data frames to the Data Parser 843 for processing of the contents of the data frame.

The Data Parser 843 parses the data frames. The Data Parser 843 identifies the command in the data frame (a LED controller configuration command or a LED control command) and decodes the payload of data frame (LED controller configuration parameter or LED control data parameters). In one embodiment, the Data Parser 843 will perform the optional cyclic redundancy code (CRC) check and if the data is good the Data Parser 843 passes the decoded command and parameter data to execution logic in the data processing core 840.

In one embodiment, the Data Parser 843 has multiple different pixel addressing modes that are used to determine if a particular data frame that was received should be applied to this specific LED controller 860. A standard addressing mode places a specific LED unit address in the address field of a data frame. In one embodiment that address specifies a start address for the LED control data in the data field. The specific LED unit identified in the address field will use the first item of LED control data in the payload field up to the LED control data width. The next sequentially addressed LED unit will use the next item of LED control data in the data payload field up to the LED control data width and so on. In other embodiments, the address may specify a single LED unit or a specified number of consecutive LED units. Note that in the present system, the size of the data payload is 288 bits such that it may store even multiples of 2, 4, 6, 8, or 12 bit wide data values.

In a group address mode, the LED control data in the data payload will only be applied to LED units assigned to a particular group. The control data may simply be applied to all the LED units in the group. In one embodiment, the system uses a bitmap processing engine that may examine a bit map in the payload to determine which subset of LED unit members of a group should change and how those LED unit members should change. Thus, each LED unit is addressable individually in the standard linear addressing system and each LED unit is addressable individually as part of an assigned group.

Data errors detected by the cyclic redundancy code (CRC) check may be handled in various different manners. In one embodiment, if the optional CRC protection has been enabled, the data processing core 840 will start to ignore data if two CRC errors are detected during a window of about 25 data frames. Furthermore, the LED outputs may be turned off during this period and the data processing core 840 will not respond to new commands. In one embodiment, the data processing core 840 will continue examining incoming LED control data frames until four data frames with correct CRC values are received. At that point, the data processing core 840 will begin processing new commands.

Many different types of commands may be implemented on a LED Controller 860. In one particular embodiment, three main types of commands are implemented: a pixel data update without a global update, a pixel data update with a global update, and a write to a control register within the LED Controller 860. A pixel update without a global update stores a set of parameters for driving one or more LEDs into a shadow register. However, those LED parameters are not immediately used. Then, when a global update command is received (addressed to this LED controller 860 or any other LED controller) the stored pixel data parameters are then used change the output of the LED driver circuits 880. In this manner, changes to many pixels can be synchronized as is needed for video displays and other display systems that operate with a series of distinct display frames.

When the data processing core 840 receives a write to a control register, the data processing core 840 will identify the appropriate control register in the control registers & fuses block 841 and write the associated data value into that control register. The contents of the control registers are volatile control bits that control the operation of the circuitry in the LED controller 860. Certain patterns of writes to control registers can be used to activate various functions instead of just setting the value of a specified control register.

In addition to the volatile control registers, the control registers & fuses block 841 also contains a set of non-volatile fuses. The fuses may be burned in order to specify a set of permanent configuration information in a LED controller 860. For example, one embodiment of a LED unit 850 implements an eight bit address value using eight fuses. In this manner a string of 256 uniquely addressable LED Units may be coupled to a single LED line driver circuit. To program the fuses in the control registers & fuses block 841, a specific pattern of writes to specified control register addresses is sent. (Note that there may or may not actually be real control registers at those specific control register addresses.) When the proper pattern of writes to specified control register addresses is sent, the data processing core 840 will burn a particular identified fuse in the control registers & fuses block 841.

The fuses in the control registers & fuses block 841 may both be used by a manufacturer that creates LED controllers 860 and a user of LED controllers 860. The manufacturer may use the fuses in the control registers & fuses block 841 to create a wide variety of different LED controllers with different performance characteristics and capabilities from the same integrated circuit design. For example, fuses in the control registers & fuses block 841 may be used to specify the number of LEDs controlled by the LED controllers 860, the accuracy of the LED control (4 bit, 6 bit, 8 bit, or 12 bit, in one embodiment), and various other LED controller features that may be enabled or disabled. In this manner, the manufacturer of LED controllers 860 may segment the marketplace of LED controllers 860 depending on how many features are required for a particular application.

Fuses in the control registers & fuses block 841 may also be used to store calibration information in LED controllers 860. Imperfections and inconsistencies in semiconductor process technology mean that no two integrated circuits will behave exactly the same. With purely digital integrated circuits, small differences will not affect the operation due to the discrete quantized data values used in digital circuits. (Large imperfections in the manufacturing of digital integrated circuit devices will create inoperable devices that are discarded.) With the LED controller 860, the presence of numerous analog circuits will mean that manufacturing differences may noticeably affect the behavior of different LED controllers.

To deal with these behavioral differences, each individual LED controller 860 will be tested and various differences between different LED controllers can be compensated for by using the fuses to store calibration data that adjusts for slight differences between different LED controllers. For example, the brightness of a LED is controlled by the amount of current that passes through the LED. But due to imperfections in integrated circuit manufacturing, the amount of current provided by the LED driver circuits 880 of different LED controllers when commanded to provide the exact same brightness level may not be identical. Thus, fuses in the control registers & fuses block 841 may be used to store current tweak/trim values designed to calibrate the current delivered to LEDs by the LED driver circuits 880. Each different LED channel on a LED controller 860 may receive its own individual current tweak/trim value.

Note that LEDs themselves may also suffer from imperfect manufacturing technology. Different LEDs that receive the exact same amount of current will not output the exact same brightness. Thus, by coupling LEDs 881 to a LED controller 860 before testing, slight manufacturing differences in both the LED controller 860 and the LEDs 881 can be compensated for with current tweak/trim calibration data programmed into the LED controller 860. This ability to calibrate current output provided by the LED driver circuits 880 allows the LED controller 860 to use less expensive LEDs that have not passed strict brightness calibration tests since the current calibration values will compensate for the varying LED in addition to the varying LED driver circuits 880.

The users of a LED controller 860 may program a set of user accessible fuses for various different application specific features made available to the users. For example, a LED controller 860 may be designed to operate with either common anode LEDs or common cathode LEDs. The usage of a CRC value to test data frames for errors may be specified by a fuse. And, as set forth earlier, a set of device address fuses may also be user programmable.

Referring back to FIG. 8, the final circuit block of the LED controller 860 is a circuit block containing LED driver circuits 880 for driving the LEDs 881. There is an independent LED driver circuit for each LED output on the LED controller 860. In the embodiment of FIG. 8, there are four different LED driver circuits for driving the four different LEDs 881. However, other embodiments contain LED driver circuits for handling a different number of LEDs 881. In the particular embodiment depicted in FIG. 8 the LEDs 881 are wired in a common cathode configuration. In a common anode configuration, the LED symbols would face in the other direction.

Each independent LED driver circuit has both digital and analog circuitry portions. The digital circuitry portion interfaces with the data processing core 840 and control registers & fuses 841. The digital circuitry portion receives the digital information specifying an intensity value indicating how much power a LED should receive. This intensity value is then adjusted according to various factors and used to drive the constant current output. The analog LED driver circuitry receives a current reference from the power system 829 and creates the constant current that will be used to actually drive the associated device.

The digital portion of a LED driver circuit controls exactly when an associated LED is to be powered on and off. To determine how to properly drive the LEDs, the digital portion consults the control registers & fuses 841 for configuration information. The control registers & fuses 841 may specify several different parameters such as if the LED is allowed to operate, if the LEDs are sinking or sourcing current (using common anode mode or the common cathode mode illustrated in FIG. 8), what the current trim/tweak value is for the LED, and a LED turn-on delay factor. This LED configuration information is combined with the LED control information received in a LED control data frame that specifies a LED intensity value (which may be zero if the LED is to be turned off) to determine how the LED will be driven. Various different output modulation systems may be used to drive the LEDs.

The digital circuitry portion uses the analog portion of a LED driver circuit 880 to drive the associated LED. The analog LED driver circuit uses a current reference received from the power system 820 to drive the LED with constant current pulses. The analog LED driver circuit signals to the power system 820 when the analog LED driver circuit does not have enough voltage from the power system 820 to operate properly. The analog LED driver circuit also signals to the power system 820 when a LED appears to have malfunctioned. Specifically, if the current passing through the LED is too high or zero, then the LED driver circuit may determine that the LED appears to be a shorted circuit or an open circuit, respectively. When a LED has malfunctioned, the system will stop activating that LED. The system may periodically retest the LED to determine if the malfunction was inaccurately detected or the problem was transitory. If the system determines that one LED has malfunctioned, the LED controller may deactivate other LEDs related to the malfunctioned LED. For example, if one LED in a set of red, green, and blue LEDs used to create a colored pixel has malfunctioned then all three LEDs associated with that pixel may be deactivated.

The LED line driver circuit 425 of FIG. 4 coupled to a set of the LED units 850 of FIG. 8 forms a very efficient LED lighting system that minimizes the amount of power wasted. In the LED line driver circuit 425, the main line driver FET 461 is always fully on or fully off such that it dissipates very little power as heat. In the individual LED units 850, the local power system 820 shunts the line current when the local supply capacitor 829 of the LED unit 850 is charged thus passing all the current to the next LED unit 850 on the line. Within each individual LED unit 850, the control circuitry uses minimal power such that the LED driver circuits 880 dissipate most of the power into the enabled LEDs 881. So the overall controlled LED lighting system is very efficient. The system draws only fairly limited power when LEDs are off. And when the LEDs are on, the system wastes very little power.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. An electronic circuit for sinking excess current and creating a biasing voltage, said electronic circuit comprising:
    a power supply circuit for generating a first electrical current at a VSupply voltage;
    a load circuit powered by said first electrical current;
    an inductor, said first electrical current passing through said inductor;
    a main transistor, said main transistor coupled to said inductor for receiving said first electrical current;
    a first diode coupled to said inductor in parallel to said main transistor such that said first electrical current passes through said first diode when said main transistor is turned off; and
    a catch circuit coupled to said first diode, said catch circuit comprising
        a multi-winding transformer, said multi-winding coupled back to said VSupply voltage from said power supply circuit, and
        a capacitor;
    such that said catch circuit creates a biasing voltage applied to said inductor when said main transistor is turned off.

2. The electronic circuit as set forth in claim 1 wherein said capacitor is coupled to a mid-point of said multi-winding transformer.

3. The electronic circuit as set forth in claim 1 wherein at least one diode couple windings of said multi-winding transformer.

4. The electronic circuit as set forth in claim 1 wherein said load circuit comprises a plurality of individually controlled circuits powered by said first electrical current.

5. The electronic circuit as set forth in claim 4 wherein said main transistor modulates data onto said first electrical current by turning said main transistor on and off, said data used to control said plurality of individually controlled circuits.

6. A method for sinking excess current and creating a biasing voltage in an electronic circuit, said method comprising:
    generating a first electrical current at a VSupply voltage with a power supply circuit;
    driving a load circuit with said first electrical current;
    driving an inductor by passing said first electrical current through said inductor;
    controlling said first electrical current with a main transistor coupled to said inductor;
    diverting said first electrical current through a first diode coupled to said inductor in parallel to said main transistor when said main transistor is turned off; and
    catching said first electrical current passing through said first diode with a catch circuit,
    said catch circuit sinking said first electrical current, and
    creating a biasing voltage with said first electrical current to bias said inductor;
    wherein said catch circuit comprises
    a multi-winding transformer, said multi-winding coupled back to said VSupply voltage from said power supply circuit, and
    a capacitor.

* * * * *